(12) United States Patent
Nussbaum (10) Patent No.: US 9,884,453 B2
(45) Date of Patent: Feb. 6, 2018

(54) DUAL ROLL FABRIC WELDING MACHINE AND METHOD OF OPERATION

(71) Applicant: Miller Weldmaster Corporation, Navarre, OH (US)

(72) Inventor: Brent G. Nussbaum, Dalton, OH (US)

(73) Assignee: Miller Weldmaster Corporation, Navarre, OH (US)

( * ) Notice: Subject to any disclaimer, the term of this patent is extended or adjusted under 35 U.S.C. 154(b) by 0 days.

(21) Appl. No.: 15/070,531

(22) Filed: Mar. 15, 2016

(65) Prior Publication Data

US 2016/0193781 A1    Jul. 7, 2016

Related U.S. Application Data

(63) Continuation of application No. 14/073,212, filed on Nov. 6, 2013, now Pat. No. 9,358,727.

(60) Provisional application No. 61/723,073, filed on Nov. 6, 2012.

(51) Int. Cl.
| | |
|---|---|
| *B29C 65/00* | (2006.01) |
| *B29C 65/78* | (2006.01) |
| *B29C 65/48* | (2006.01) |
| *D06H 5/00* | (2006.01) |
| *B41J 3/413* | (2006.01) |
| *B29C 65/08* | (2006.01) |
| *B29C 65/18* | (2006.01) |
| *B29C 65/62* | (2006.01) |

(52) U.S. Cl.
CPC .......... *B29C 65/7894* (2013.01); *B29C 65/48* (2013.01); *B29C 65/7861* (2013.01); *B29C 66/1122* (2013.01); *B29C 66/435* (2013.01); *B29C 66/729* (2013.01); *B29C 66/86533* (2013.01); *B41J 3/413* (2013.01); *D06H 5/00* (2013.01); *B29C 65/08* (2013.01); *B29C 65/18* (2013.01); *B29C 65/62* (2013.01); *B29C 65/78* (2013.01); *B29C 65/7858* (2013.01); *B29C 65/7864* (2013.01); *B29C 65/7888* (2013.01); *B29C 66/43* (2013.01); *B29C 66/836* (2013.01); *B29C 66/83411* (2013.01); *Y10T 156/1317* (2015.01); *Y10T 156/1348* (2015.01); *Y10T 156/1712* (2015.01); *Y10T 156/1715* (2015.01)

(58) Field of Classification Search
CPC ............ B29C 65/7858; B29C 65/7861; B29C 65/7864; B29C 65/7888; B29C 65/6897; B29C 65/78; B29C 2301/46
USPC ......... 156/73.5, 91, 157, 433, 439, 502, 544
See application file for complete search history.

(56) References Cited

U.S. PATENT DOCUMENTS

| | | |
|---|---|---|
| 1,901,477 A | 3/1933 | Southwick |
| 1,910,259 A | 5/1933 | Raymond |
| 2,220,704 A | 11/1940 | Boles et al. |
| 2,487,392 A | 11/1949 | Southwick |

(Continued)

*Primary Examiner* — Mark A Osele
*Assistant Examiner* — Nickolas Harm
(74) *Attorney, Agent, or Firm* — Sand & Sebolt (57) ABSTRACT

A dual roll fabric welding or seaming machine is configured to seam pieces of sheet material to one another as the pieces move downstream. The machine includes modular gantries and various actor devices which may be readily mounted on any of the gantries to interact with the moving sheet material to achieve various functions, such as seaming pieces of sheet material together, forming hems, applying grommets to the sheet material, printing on the sheet material, connecting reinforcement strips or ropes to the sheet material and cutting the sheet material.

21 Claims, 3 Drawing Sheets

(56) References Cited

U.S. PATENT DOCUMENTS

| | | | | |
|---|---|---|---|---|
| 3,392,638 | A * | 7/1968 | Reineman | B31B 21/00 493/10 |
| 3,638,592 | A * | 2/1972 | Fryatt | B29C 53/04 112/147 |
| 4,757,559 | A * | 7/1988 | Zanoni | A41D 1/06 2/275 |
| 4,795,520 | A * | 1/1989 | Klabius | B29C 65/04 100/326 |
| 4,856,698 | A * | 8/1989 | Marianne | B23K 37/047 228/4.1 |
| 4,931,126 | A * | 6/1990 | McCarville | B29C 65/78 156/304.6 |
| 5,355,820 | A * | 10/1994 | Conrad | B63H 9/0657 114/102.31 |
| 5,460,672 | A | 10/1995 | Mallonee | |
| 5,836,224 | A * | 11/1998 | Gerber | B26D 7/018 83/169 |
| 6,059,391 | A * | 5/2000 | Fulkerson | B41J 3/28 101/44 |
| 6,520,057 | B1 | 2/2003 | Steadman | |
| 6,615,892 | B2 * | 9/2003 | Hubbard | B29C 65/10 156/428 |
| 7,094,298 | B2 | 8/2006 | Schwetz | |
| 8,201,608 | B2 | 6/2012 | Pilpel | |
| 8,210,418 | B1 | 7/2012 | Landoll et al. | |
| 2002/0005155 | A1 * | 1/2002 | Nelson | A41H 42/00 112/475.08 |
| 2004/0162204 | A1 * | 8/2004 | Petratto | B31B 1/04 493/71 |
| 2005/0109712 | A1 | 5/2005 | Dreyer | |
| 2008/0308234 | A1 | 12/2008 | Seo | |
| 2009/0064911 | A1 * | 3/2009 | Oxley | D05B 11/00 112/2.1 |
| 2009/0266468 | A1 * | 10/2009 | Pilpel | B29C 65/5042 156/60 |
| 2010/0330336 | A1 | 12/2010 | Guillot et al. | |
| 2011/0083803 | A1 * | 4/2011 | Henry | B29C 65/103 156/308.2 |
| 2014/0124125 | A1 | 5/2014 | Nussbaum et al. | |

* cited by examiner

DUAL ROLL FABRIC WELDING MACHINE AND METHOD OF OPERATION

CROSS REFERENCE TO RELATED APPLICATIONS

This application is a continuation of U.S. patent application Ser. No. 14/073,212, filed Nov. 6, 2013, which claims priority from U.S. Provisional Patent Application Ser. No. 61/723,073, filed Nov. 6, 2012; the disclosures of which are incorporated herein by reference.

BACKGROUND

1. Technical Field

The technical field relates generally to seaming machines. More particularly, the technical field relates to a seaming machine or fabric welding machine and method of seaming two or more sheet segments together and performing other functions to manipulate the seamed sheet of material. Specifically, the technical field relates to a dual roll fabric welding machine with a modular configuration.

2. Background Information

Dual roll fabric welding machines are well known in the art. Typically, first and second rolls of sheet material are controlled to unwind and move downstream through the machine so that the two sheets of unwound material are seamed or welded together to form a single wider sheet. The machine then performs other functions to further manipulate or alter the seamed sheet material. One problem with such machines is the difficulty in setting them up for operation especially when there is a requirement to meet one specification and then reconfiguring the machine to meet a different specification.

SUMMARY

In one aspect, a method may comprise the steps of moving sheet material downstream past a first gantry and a second gantry; performing a function which affects the sheet material with a first actor device mounted on the first gantry as the sheet material is moving downstream; performing a function which affects the sheet material with a second actor device mounted on the second gantry as the sheet material is moving downstream; wherein the first actor device is removable from the first gantry and mountable on the second gantry; and the second actor device is removable from the second gantry and mountable on the first gantry.

BRIEF DESCRIPTION OF THE SEVERAL VIEWS OF THE DRAWINGS

A sample embodiment is set forth in the following description and is shown in the drawings and is particular and distinctly pointed out and set forth in the appended claims.

DETAILED DESCRIPTION

Figure 1:
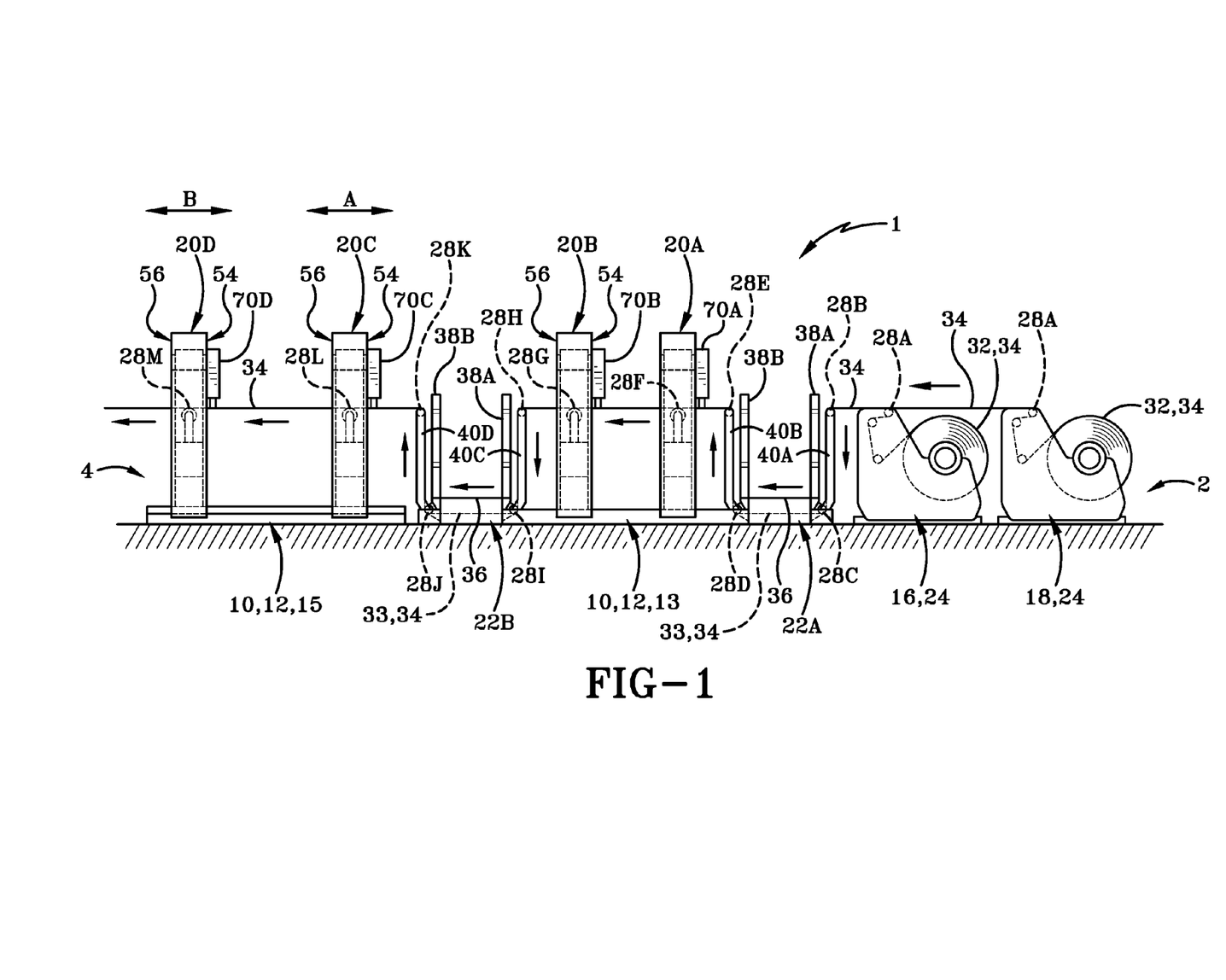
FIG. 1 is a side elevational view of a seaming machine.
Figure 2:
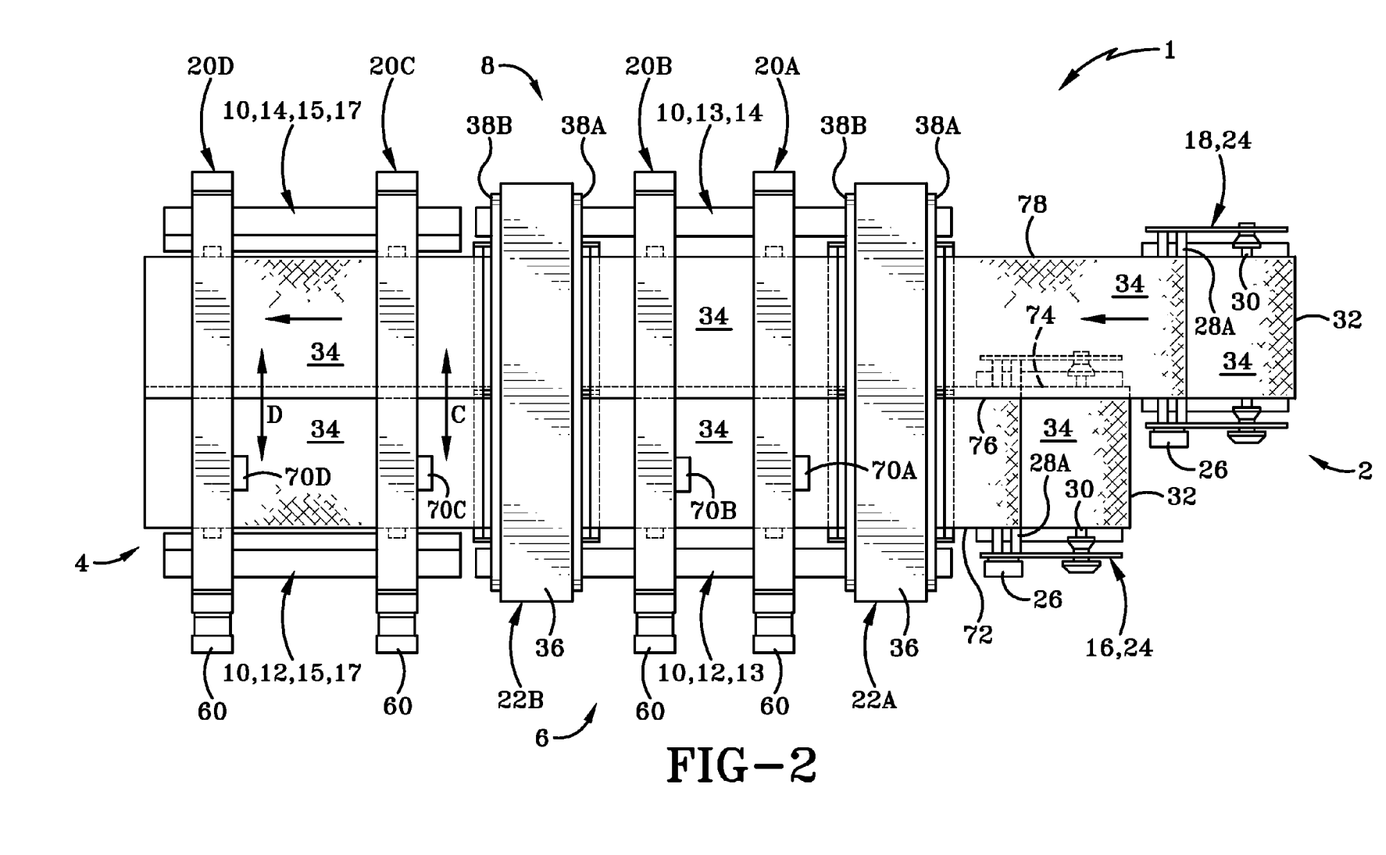
FIG. 2 is a top plan view of the seaming machine.

A seaming or fabric welding machine is shown generally at 1 in FIGS. 1 and 2. In the exemplary embodiment, machine 1 is shown as a plastic welding machine in which plastic welders are used to form seams between various segments of sheet material. However, machine 1 also represents various other types of seaming machines, such as ultrasonic welding machines, radio frequency (RF) welding machines, adhesive seaming machines, gluing seaming machines and sewing machines. Machine 1 is used to seam together various segments of sheet material to form larger sheets of material, such as tarpaulins for covering trailers and the like, tents, awnings, canopies, banners, and various other items.

As shown in FIGS. 1 and 2, machine 1 has first and second ends 2 and 4 defining therebetween a longitudinal direction and first and second sides 6 and 8 defining therebetween an axial direction. First end 2 is an upstream end and second end 4 is a downstream end whereby during operation of machine 1 sheet material moves downstream in the longitudinal direction from upstream end 2 to downstream end 4. Machine 1 is configured to weld segments of sheet material together along respective typically parallel longitudinal edges thereof to form a welded sheet of material having a length which is increased in the axial direction and typically about (and a little less than) twice as wide as the two sheets from which it is formed although this may vary.

Machine 1 includes a rigid frame base 10 on which several components are securely mounted. In the exemplary embodiment, base 10 includes longitudinally elongated parallel left and right rails 12 and 14, each of which includes an upstream section 13 and a downstream section 15. Downstream section 15 defines a longitudinally elongated U-shaped channel 17 which opens upwardly and extends from adjacent the upstream end of section 15 to adjacent the downstream end of section 15. Machine 1 further includes a left sheet material unwinding assembly 16 and a right sheet material unwinding assembly 18. Left assembly 16 is adjacent, to the left of and downstream of right assembly 18. Machine 1 also includes several gantries 20. In the exemplary embodiment, there are four gantries 20A-20D all of which are downstream of unwinding assemblies 16 and 18 and which are sequentially downstream of one another. Gantries 20 are longitudinally spaced from one another and secured to rails 12 and 14. Gantries 20 are identical or essentially identical and are aligned so as to appear superimposed on one another as viewed in the longitudinal direction. Machine 1 further includes upstream and downstream catwalks 22A-B each extending between and mounted on upstream sections 13 of rails 12 and 14. Catwalk 22A is downstream of unwinding assemblies 16 and 18 and upstream of all of gantries 20 and catwalk 22B. Downstream catwalk 22B is downstream of gantries 20A and 20B and upstream of gantries 20C and 20D.

Each unwinding assembly 16, 18 includes a rigid frame 24 with an electronic control box 26 mounted thereon. Each unwinding assembly also includes a horizontal roller 28A and is configured for removably mounting thereon a spool 30 configured to support a roll 32 of sheet material 34 to be unwound from roll 32. Each of roller 28A and spool 30 is axially elongated and rotatable about an axis extending in the axial direction so that roller 28A, spool 30 and each axis is perpendicular to the longitudinal direction and, during operation, perpendicular to movement of unwound sheet material 34 in the downstream direction. Roller 28A and spool 30 are thus parallel to one another. Unwinding assemblies 16 and 18 axially overlap one another partially as viewed in the longitudinal direction. More particularly, each of left and right unwinding assemblies 16 and 18 has left and right sides, and are positioned so that the left side of right unwinding assembly 18 is to the left of the right side of left unwinding assembly 16 and to the right of the left side of unwinding assembly. The left side of right unwinding assembly 18 is axially offset and adjacent the right side of left unwinding assembly 16 whereby the left edge of sheet material 34 unwinding from right unwinding assembly 18 overlaps and is adjacent the right edge of sheet material 34 unwinding from left unwinding assembly 16. The left side of right unwinding assembly 18 is axially offset and distal the left side of left unwinding assembly 16.

Each catwalk 22 includes a horizontal axially elongated walkway 36 having an upstream side and a downstream side, a vertical upstream fence 38A extending upwardly from adjacent the upstream side and a vertical downstream fence 38B extending upwardly from adjacent the downstream side. Fences 38A and 38B are axially elongated and longitudinally spaced from one another. Each walkway 36 and fence 38 extends from adjacent left side 6 and left rail 12 to adjacent right side 8 and right rail 14. Each walkway 36 includes a central portion which extends from adjacent rail 12 to adjacent rail 14 and is slightly elevated so that the bottom of each central portion is spaced upwardly from the floor on which machine 1 is seated whereby the floor and bottom of each central portion define therebetween an open space 33 to allow sheet material 34 to move therethrough during operation, as discussed further below. Each fence may also be called a guardrail which serves to protect a person from falling off of the walkway and thus helps to prevent injury which might otherwise occur. Each fence 38 typically includes at least a pair of rigid uprights on either end and several rigid horizontal bars extending from adjacent the left end of the fence to adjacent the right end of the fence and secured to the uprights. Rigid roller supports 40A and 40B are provided respectively upstream of and adjacent the fence 38A of upstream catwalk 22A and downstream of and adjacent fence 38B of upstream catwalk 22A. Rigid roller supports 40C and 40D are likewise provided respectively upstream of and adjacent the fence 38A of downstream catwalk 22B and downstream of and adjacent fence 38B of downstream catwalk 22B. The roller supports 40 associated with each catwalk 22 may be secured to the catwalk or separate therefrom. In either case, supports 40 are typically secured directly or indirectly to upstream sections 13 of rails 12 and 14.

Machine 1 further includes multiple horizontal rollers 28B-M in addition to rollers 28A. All rollers 28 are axially elongated, parallel to one another and rotatable about respective horizontal parallel axes which extend in the axial direction. Roller 28B is rotatably mounted on roller support 40A adjacent an upper end thereof and roller 28C is rotatably mounted on roller support 40A adjacent a lower end thereof. Roller 28E is rotatably mounted on roller support 40B adjacent an upper end thereof and roller 28D is rotatably mounted on roller support 40B adjacent a lower end thereof. Roller 28H is rotatably mounted on roller support 40C adjacent an upper end thereof and roller 28I is rotatably mounted on roller support 40C adjacent a lower end thereof. Roller 28K is rotatably mounted on roller support 40D adjacent an upper end thereof and roller 28J is rotatably mounted on roller support 40D adjacent a lower end thereof. Rollers 28F, 28G, 28L and 28M are respectively rotatably mounted on gantries 20A, 20B, 20C and 20D.

In the exemplary embodiment, the tops of the upper set of rollers 28B, 28E, 28F, 28G, 28H, 28K, 28L and 28M are at about the same height as one another while the bottoms of the lower set of rollers 28C, 28D, 28I and 28J are likewise at about the same height as one another. The rollers 28 in the lower set are generally adjacent base 10 and the lower end of machine 1 and substantially lower than the rollers of the upper set. The bottoms of the rollers 28C and 28D are lower than the bottom of the central portion of walkway 36 of upstream catwalk 22A. Likewise, the bottoms of the rollers 28I and 28J are lower than the bottom of the central portion of walkway 36 of downstream catwalk 22B. Space 33 below upstream catwalk 22A extends from adjacent the bottom of roller 28C to adjacent the bottom of roller 28D. Likewise, space 33 below downstream catwalk 22B extends from adjacent the bottom of roller 28I to adjacent the bottom of roller 28J.

Figure 3:
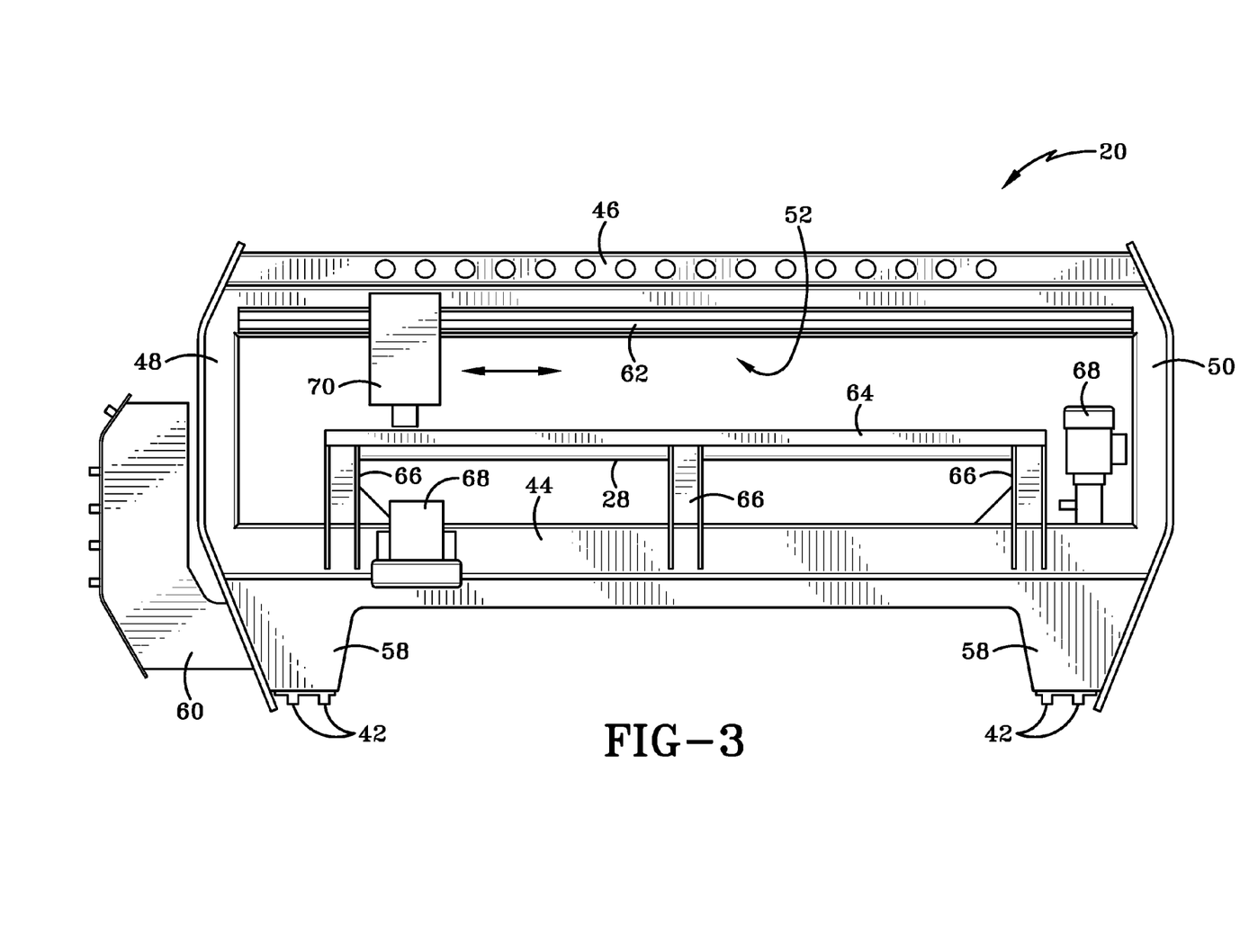
FIG. 3 is a front elevational view of one of the gantries.
Similar numbers refer to similar parts throughout the drawings.

As noted above, gantries 20 are identical or nearly identical and thus are formed as modular units which can be used in place of one another, that is, they are typically interchangeable. Gantry 20 of FIG. 3 is thus representative of each of gantries 20A-20D although there may be some relatively minor variations. Primarily, any such variation is typically related to the configuration of gantries 20A and 20B relative to the configuration of gantries 20C and 20D. More particularly, gantries 20A and 20B are typically stationary gantries and thus fixedly secured to sections 13 of rails 12 and 14, whereas gantries 20C and 20D are typically longitudinally movable gantries (Arrows A, B in FIG. 1) and thus movably mounted on sections 15 of rails 12 and 14. Thus, gantries 20C and 20D typically include rail-engaging or track-engaging wheels 42 whereby the left wheels 42 rollingly engage section 15 of left rail 12 and the right wheels 42 rollingly engage section 15 of right rail 14. Wheels 42, which may be within channels 17 respectively, may be drive wheels configured to drive longitudinal movement of gantries 20C and 20D upstream and downstream along sections 15, or may be non-driven wheels such that an actuator may push or pull gantries 20C and 20D upstream and downstream. Gantries 20A and 20B may be formed without wheels 42. However, gantries 20A and 20B may also be formed such that wheels 42 can be readily mounted thereon. Likewise, gantries 20C and 20D may be formed such that wheels 42 are readily removable. Furthermore, all of the gantries may be formed with wheels, and gantries 20A and 20B can simply be positioned for stationary use, such as by locking the wheels or placing them on a portion of base 10 in a manner that will prevent them from rolling.

With primary reference to FIG. 3, gantry 20 is described in greater detail. Gantry 20 comprises a rigid frame which includes a rigid lower axial beam 44, a rigid upper axial beam 46, and rigid left and right uprights 48 and 50. The left end of lower beam 44 is rigidly secured to the lower end of left upright 48, and the left end of upper beam 46 is rigidly secured to the upper end of left upright 48. The right end of lower beam 44 is rigidly secured to the lower end of right upright 50, and the right end of upper beam 46 is rigidly secured to the upper end of right upright 50. Beams 44 and 46 and uprights 48 and 50 together form a rectangular structure and define therebetween a sheet material-receiving through passage 52 which extends from the upstream end of gantry 20 to the downstream end of gantry 20 and through which sheet material 34 passes during operation. Passage 52 thus has an entrance opening 54 (FIG. 1) along the upstream end of gantry 20 and an exit opening 56 along the downstream end of gantry 20. Gantry 20 has left and right feet 58 secured to and extending downwardly from bottom of the main rectangular structure respectively along the left and right sides thereof. A control box 60 is mounted on the left side of the rectangular structure of gantry 20 and is typically in the form of a programmable logic controller (PLC). A mounting rail 62 extends along the bottom of upper beam 46 from adjacent left upright 48 to adjacent right upright 50. An axially elongated horizontal work platform 64 is provided within passage 52 directly in front of or upstream of and parallel to roller 28 of gantry 20. Platform 64 is spaced upwardly of and rigidly secured to lower beam 44 by a plurality of support poles 66. One or more actuators or motors 68 are typically mounted on gantry 20 and in electrical or other communication with control box 60 so that box 60 may be programmed to specifically control actuators or motors 68.

Gantries are configured to respectively support actor devices 70A-70D. Devices 70 are mountable on any of mounting rails 62. Thus, mounting rails 62 are configured as universal mounting structures with respect to devices 70 so that any of devices 70 may be readily mounted on any given rail 62. Each device 70 shown may be in the form of a single unit or may include several units or actor devices which perform different functions. More particularly, each actor device 70 is configured to interact with sheet material 34 during downstream movement of sheet material 34 though machine 1. Each device 70 is configured to perform a function or operation which directly affects sheet material 34 during the downstream movement of material 34. Each actor device thus includes a component that engages sheet material 34 or applies or connects a workpiece component to sheet material 34, which itself is a workpiece component, to ultimately produce a finished product or workpiece. Each control box 60 is typically programmed to control the actor device or devices on the corresponding gantry 20 to provide a specified predetermined configuration of the final workpiece formed from the pieces of sheet material 34 which is unwound from rolls 32 and any other components added thereto as discussed below.

Each actor device 70 may, for example, be or include a welding device or other seaming device capable of seaming or welding a portion of sheet material 34 to itself or another piece of sheet material 34; a folding device positioned to fold over a portion of sheet material 34; a keder device or rope positioning device configured to position a rope within a folded loop or channel of sheet material 34 to be seamed to form a rope passage so that the rope extends through the rope passage and is thus connected to the sheet material; a grommeting device or grommet applicator which applies or secures grommets or eyelets to the sheet material; a print head which prints various indicia on sheet material 34, such as logos or other alphabetical and/or numerical characters and/or designs or graphics; a cross cutting device which cuts sheet material in the axial direction typically perpendicular to the downstream movement of sheet material 34 through machine 1.

The above-noted seaming or welding device mentioned in the previous paragraph may be, for example, an overlap welding or other seaming device for welding or otherwise seaming two pieces of sheet material together along respective parallel longitudinal edges of the two pieces. The above-noted seaming or welding device may also, for example, be a part of a hem former which forms a hem along an edge of sheet material 34 by folding over with a folding device a first section of sheet material 34 onto an adjacent second section of sheet material 34 and welding or otherwise seaming the first and second sections to one another. The above-noted seaming or welding device may also be, for example, a cross welder or cross seamer which welds or otherwise seams an additional strip of sheet material (typically a reinforcement strip) onto sheet material 34 so that the additional strip secured to sheet material 34 is axially elongated, typically perpendicular to the downstream movement of sheet material 34 through machine 1. The examples of actor devices 70 given above is not exhaustive and may include other such devices known in the art. The welding device typically includes a heated welding tip which is positionable adjacent sheet material 34 and a pair of pinch rollers which are adjacent and downstream of the welding tip and configured to press therebetween the sheet material heated by the welding tip to complete the welded seam.

Although the various types of actor devices 70 may be mounted on any given gantry 20, machine 1 in the exemplary embodiment it typically configured as follows. Device 70A typically comprises an overlap seaming device for seaming two pieces of sheet material together, one or more hem formers which include a folding device and a seaming device, and may also include a keder device or rope positioning device as discussed above. Device 70B typically includes a grommeting device or grommet applicator and a print head. Device 70C typically includes a cross welder or cross seamer for securing a reinforcement strip to sheet material 34. Device 70D typically includes a cross cutting device.

The operation of machine 1 is now described given the configuration provided in the previous paragraph. Rolls 32 of sheet material 34 are mounted on spools 30 and positioned so that material 34 may be unwound from rolls 32. Control boxes 26 and 60 are programmed to control the various operations performed by machine 1 and thus are in electrical or other communication with the various actuators, motors, brakes, various electrical circuitry and other components necessary to control these operations. More particularly, boxes 26 are programmed to properly control the unwinding of sheet material 34 from the respective rolls 32. Each piece of sheet material 34 moves downstream from its respective roll 32 to and beyond the downstream end 4 of machine 1. Each piece of sheet material 34 engages each of rollers 28 as it moves downstream. More particularly, each piece of sheet material 34 goes over its respective roller 28A and over rollers 28B, 28E, 28F, 28G, 28H, 28K, 28L and 28M and goes under rollers 28C, 28D, 28I and 28J. Thus, each piece of sheet material 34 extends generally horizontally from its roller 28A to roller 28B, substantially vertically downward from roller 28B to roller 28C upstream of and adjacent fence 38A of catwalk 22A, substantially horizontally from roller 28C to roller 28D under walkway 36 of catwalk 22A within upstream space 33, substantially vertically upward from roller 28D to roller 28E downstream of and adjacent fence 38B of catwalk 22A, substantially horizontally from roller 28E to roller 28F to roller 28G to roller 28H and through passages 52 of gantries 28A and 28B, substantially vertically downward from roller 28H to roller 28I upstream of and adjacent fence 38A of catwalk 22B, substantially horizontally from roller 28I to roller 28J under walkway 36 of catwalk 22B within downstream space 33, substantially vertically upward from roller 28J to roller 28K downstream of and adjacent fence 38B of catwalk 22B, and substantially horizontally from roller 28K to roller 28L to roller 28M and through passages 52 of gantries 28C and 28D.

Sheet material 34 from left roll 32 has parallel longitudinal left and right edges 72 and 74. Sheet material 34 from right roll 32 has parallel longitudinal left and right edges 76 and 78 which are parallel to edges 72 and 74. Left edge 72 of the left piece of sheet material 34 is adjacent the left ends of rollers 28B-28M and generally adjacent left side 6. Right edge 78 of the right piece of sheet material 34 is adjacent the right ends of rollers 28B-28M and generally adjacent right side 8. Left edge 76 of the right piece of sheet material 34 partially axially overlaps and is adjacent right edge 74 of the left piece of sheet material 34 and distal left edge 72 of the left piece.

As the left and right pieces of sheet material 34 move downstream, the various actor devices 70 interact with these pieces. The overlap welding or seaming device of actor device 70A welds or otherwise seams left and right pieces of sheet material 34 together along edges 74 and 76 to form a longitudinally elongated overlap seam parallel to edges 72-76 and to the direction of movement of material 34 through machine 1. Actor device 70A typically includes a hem former which forms a hem along one of left edge 72 of the left piece of sheet material 34 and right edge 76 of the right piece of sheet material 34. Actor device 70A may also have another hem former which forms a hem along the other of left edge 72 and right edge 76. When desired, actor device 70A may also include one or more keder or rope positioning devices to position a rope within the folded loop or channel formed by the one or more folding devices of device 70A along edges 72 and/or 76, whereby the seaming device of the hem former seams the sheet material 34 to form a rope passage along edges 72 and/or 76 so that the rope extends through the rope passage and is thus connected to the sheet material.

After the overlap seaming device has interacted with the left and right pieces of sheet material to form the overlap seam therebetween, the two pieces are seamed together to form a single joined piece of sheet material 34 extending from adjacent the left ends of rollers 28F-M to adjacent the right ends of rollers 28F-M. The grommeting device or grommet applicator of actor device 70B secures grommets or eyelets to the joined piece of sheet material 34 in accordance with the program of control box 60 of gantry 20B. The print head of actor device 70B prints the desired indicia on the joined piece of sheet material 34 in accordance with the program of control box 60 of gantry 20B. The cross welder or seamer of actor device 70C moves axially (Arrow C in FIG. 2) across the joined sheet material 34 to weld or otherwise seam a reinforcement strip of sheet material onto sheet material 34 as described above in accordance with the program of control box 60 of gantry 20C. This step occurs as gantry 20C moves downstream (Arrow A in FIG. 1) at the same downstream rate as sheet material 34 under control of the program of control box 60 of gantry 20C. Control box 60 of gantry 20C then controls gantry 20C to move back upstream to its home position. The cross cutting device of actor device 70D moves axially (Arrow D in FIG. 2) across the joined sheet material 34 to cut the joined pieces of sheet material 34 in the axial direction as described above in accordance with the program of control box 60 of gantry 20D. This step occurs as gantry 20D moves downstream (Arrow B) at the same downstream rate as sheet material 34 under control of the program of control box 60 of gantry 20D. Control box 60 of gantry 20D then controls gantry 20D to move back upstream to its home position.

After the joined sheet material 34 has been cut by the cutting device of actor device 70D, the separated piece is a finished workpiece. In the exemplary embodiment of machine 1, all operations of machine 1 occur while sheet material is moving downstream, thus providing an automated continuous, non-stop operation absent normal machine shutdown or shutdown for repair or adjustments. When the user desires to change the configuration of machine 1 to meet an alternate product specification, doing so is relatively simple due to the ease with which the actor devices may be removed from one gantry and/or mounted on a different gantry. Furthermore, if additional gantries are needed to provide additional functions performed by the actor devices, it is a relatively simple matter to add such gantries due to their modular configuration.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration is an example and is not limited to the exact details shown or described.

The invention claimed is:

1. A method comprising the steps of:
    moving a first piece of sheet material having parallel longitudinal left and right edges and a second piece of sheet material having parallel longitudinal left and right edges downstream past a first gantry and a second gantry;
    performing a function which affects the sheet material with a first actor device mounted on the first gantry as the sheet material is moving downstream;
    performing a function which affects the sheet material with a second actor device mounted on the second gantry as the sheet material is moving downstream;
    wherein the first actor device is removable from the first gantry and mountable on the second gantry; and
    the second actor device is removable from the second gantry and mountable on the first gantry, wherein one of the steps of performing a function comprises seaming the first and second pieces of sheet material together along the right edge of the first piece of sheet material and the left edge of the second piece of sheet material as the first and second pieces of sheet material move downstream, and wherein one of the steps of performing a function comprises seaming a reinforcement strip onto the sheet material with a cross seamer as the sheet material is moving downstream.

2. The method of claim 1 wherein the first gantry is essentially identical to the second gantry.

3. The method of claim 1 further comprising the step of unwinding a first piece of the sheet material from a first sheet material unwinding assembly upstream of the first and second gantries.

4. The method of claim 3 further comprising the step of unwinding a second piece of the sheet material from a second sheet material unwinding assembly upstream of the first and second gantries so that a left edge of the first piece of sheet material overlaps and is adjacent a right edge of the second piece of sheet material.

5. The method of claim 1 further comprising the step of moving one of the first and second gantries upstream or downstream relative to the other of the first and second gantries.

6. The method of claim 5 wherein the step of moving one of the first and second gantries upstream or downstream comprises rollingly engaging left and right rails with a plurality of wheels mounted on the one of the first and second gantries.

7. The method of claim 1 further comprising the steps of providing a catwalk which extends between and is mounted on left and right rails; and moving one of the first and second gantries upstream or downstream by rollingly engaging the left and right rails with a plurality of wheels mounted on the one of the first and second gantries.

8. The method of claim 1 wherein one of the first and second gantries is stationary; and the step of moving comprises moving the sheet material downstream past a catwalk which is spaced from the first and second gantries; and further comprising the step of moving the other of the first and second gantries upstream or downstream relative to the catwalk.

9. The method of claim 1 wherein the step of moving comprises moving the sheet material downstream under a walkway of a catwalk.

10. The method of claim 9 wherein the step of moving comprises moving the sheet material downstream so that the sheet material engages and goes under a first roller having a bottom which is lower than a bottom of the walkway.

11. The method of claim 10 wherein the first roller is upstream of and adjacent the catwalk; and the step of moving comprises moving the sheet material downstream so that the sheet material engages and goes under a second roller which is downstream of and adjacent the catwalk and which has a bottom which is lower than the bottom of the walkway.

12. The method of claim 9 wherein the walkway has an upstream side and a downstream side; and the catwalk comprises an upstream fence extending upwardly from adjacent the upstream side, and a downstream fence extending upwardly from adjacent the downstream side.

13. A method comprising the steps of:
moving sheet material downstream past a first gantry and a second gantry;
performing a function which affects the sheet material with a first actor device mounted on the first gantry as the sheet material is moving downstream;
performing a function which affects the sheet material with a second actor device mounted on the second gantry as the sheet material is moving downstream;
wherein the first actor device is removable from the first gantry and mountable on the second gantry; and
the second actor device is removable from the second gantry and mountable on the first gantry, wherein one of the steps of performing a function comprises seaming a reinforcement strip onto the sheet material with a cross seamer as the sheet material is moving downstream.

14. A method comprising the steps of:
moving sheet material downstream past a first gantry and a second gantry;
performing a function which affects the sheet material with a first actor device mounted on the first gantry as the sheet material is moving downstream;
performing a function which affects the sheet material with a second actor device mounted on the second gantry as the sheet material is moving downstream;
wherein the first actor device is removable from the first gantry and mountable on the second gantry; and
the second actor device is removable from the second gantry and mountable on the first gantry, wherein one of the steps of performing a function comprises securing a grommet to the sheet material as the sheet material is moving downstream.

15. A method comprising the steps of:
moving sheet material downstream past a first gantry and a second gantry;
performing a function which affects the sheet material with a first actor device mounted on the first gantry as the sheet material is moving downstream;
performing a function which affects the sheet material with a second actor device mounted on the second gantry as the sheet material is moving downstream;
providing a catwalk which extends between and is mounted on left and right rails; and
moving one of the first and second gantries upstream or downstream by rollingly engaging the left and right rails with a plurality of wheels mounted on the one of the first and second gantries;
wherein the first actor device is removable from the first gantry and mountable on the second gantry; and
the second actor device is removable from the second gantry and mountable on the first gantry.

16. A method comprising the steps of:
moving sheet material downstream past a first gantry and a second gantry;
performing a function which affects the sheet material with a first actor device mounted on the first gantry as the sheet material is moving downstream;
performing a function which affects the sheet material with a second actor device mounted on the second gantry as the sheet material is moving downstream;
wherein the first actor device is removable from the first gantry and mountable on the second gantry; and
the second actor device is removable from the second gantry and mountable on the first gantry, wherein one of the first and second gantries is stationary; and the step of moving comprises moving the sheet material downstream past a catwalk which is spaced from the first and second gantries; and further comprising the step of moving the other of the first and second gantries upstream or downstream relative to the catwalk.

17. A method comprising the steps of:
moving sheet material downstream past a first gantry and a second gantry;
performing a function which affects the sheet material with a first actor device mounted on the first gantry as the sheet material is moving downstream;
performing a function which affects the sheet material with a second actor device mounted on the second gantry as the sheet material is moving downstream;
wherein the first actor device is removable from the first gantry and mountable on the second gantry; and
the second actor device is removable from the second gantry and mountable on the first gantry, wherein the step of moving comprises moving the sheet material downstream under a walkway of a catwalk.

18. The method of claim 17 wherein the step of moving comprises moving the sheet material downstream so that the sheet material engages and goes under a first roller having a bottom which is lower than a bottom of the walkway.

19. The method of claim 18 wherein the first roller is upstream of and adjacent the catwalk; and the step of moving comprises moving the sheet material downstream so that the sheet material engages and goes under a second roller which is downstream of and adjacent the catwalk and which has a bottom which is lower than the bottom of the walkway.

20. The method of claim 17 wherein the walkway has an upstream side and a downstream side; and the catwalk comprises an upstream fence extending upwardly from adjacent the upstream side, and a downstream fence extending upwardly from adjacent the downstream side.

21. A method comprising the steps of:
moving a first piece of sheet material having parallel longitudinal left and right edges and a second piece of sheet material having parallel longitudinal left and right edges downstream past a first gantry and a second gantry;
performing a function which affects the sheet material with a first actor device mounted on the first gantry as the sheet material is moving downstream;

performing a function which affects the sheet material with a second actor device mounted on the second gantry as the sheet material is moving downstream;
wherein the first actor device is removable from the first gantry and mountable on the second gantry; and
the second actor device is removable from the second gantry and mountable on the first gantry, wherein one of the steps of performing a function comprises seaming the first and second pieces of sheet material together along the right edge of the first piece of sheet material and the left edge of the second piece of sheet material as the first and second pieces of sheet material move downstream, and wherein one of the steps of performing a function comprises securing a grommet to the sheet material as the sheet material is moving downstream.

* * * * *